J. CRAWFORD.
ICE-TOOL.
No. 189,196. Patented April 3, 1877.
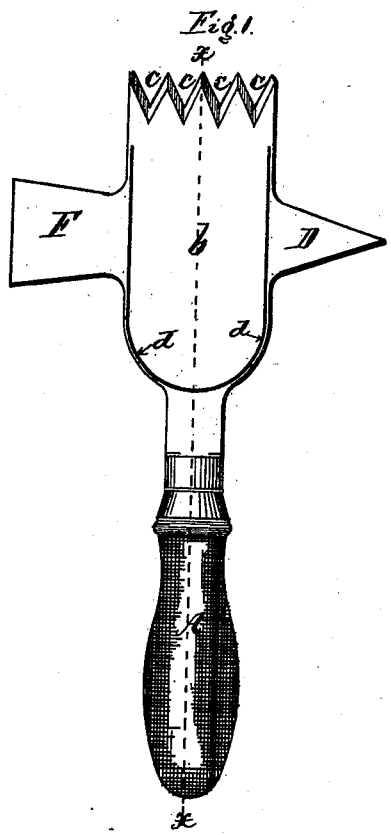
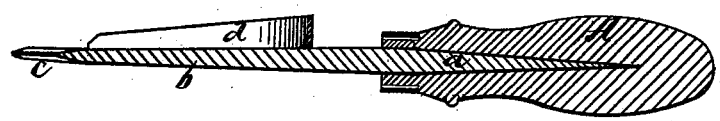

UNITED STATES PATENT OFFICE.

JOHN CRAWFORD, OF NEW YORK, N. Y., ASSIGNOR, BY MESNE ASSIGNMENTS, TO REBECCA CHAPMAN, OF PLAINFIELD, N. J.

IMPROVEMENT IN ICE-TOOLS.

Specification forming part of Letters Patent No. 189,196, dated April 3, 1877; application filed February 9, 1877.

*To all whom it may concern:*

Be it known that I, JOHN CRAWFORD, of the city of New York, in the county and State of New York, have invented a new and useful Improved Ice Tool or Implement, of which the following is a full, clear, and exact description:

My invention consists in a combination tool or implement comprising the following devices namely: a hatchet, pick, cutter or scraper, and shovel, provided with a handle common to all, and designed for the use of housekeepers, bar-keepers, dispensers of soda-water, and others employing cracked, granulated, or powdered ice, the pick and hatchet being used to break up large pieces of ice into small lumps, or to granulate them, the cutter being somewhat of the nature of a plane in shaving or powdering the ice, and also capable of use in reducing lumps to very small pieces, and the shovel affording means for handling the comminuted substance.

In the drawings illustrating my invention, Figure 1 is a top-plan view, and Fig. 2 a longitudinal section on line $x\ x$ of Fig. 1.

The same letters are used to indicate like parts in the two figures.

The letter A indicates the handle, to which a blade, $b$, is attached by a shank, $a$, entering said handle. The blade $b$ is made flat and broad, and is provided with a hatchet, F, on one side, and a pick, D, on the opposite side, both devices being of substantially the form shown, and made of one piece, if so desired, with the blade $b$. The edge of the blade $b$ opposite the handle is constructed with a number of sharpened points or teeth, $c\ c$, which constitute the cutter. $d\ d$ represent a strip of metal, or flange or guard, extending vertically around the edge of the rear end of the blade $b$, and along the edges of its two longitudinal sides, and forming with the blade $b$ the shovel.

The functions of these several devices are as follows: The hatchet and pick, of each of which the handle A is an essential part, may be used indifferently in dividing or splitting large cakes or lumps of ice; but, as is well known, the pick is the better adapted for breaking small pieces into still smaller lumps, so that each has its peculiar office. The teeth or points $c\ c$ of the cutter having sharpened edges and extremities, the said cutter may be employed in finely granulating ice, or in the manner of a plane to shave or powder the ice. The blade $b$, with its guard $d\ d$, serves as a shovel for removing the prepared ice to the place of its intended use, and said blade, terminating in the serrations $c\ c$, is rendered more efficacious in handling ice by reason of the greater facility with which it will enter a mass of granulated ice consequent upon this feature of its construction.

The combination of these several elements or devices in a single ice-working implement will be found to produce an exceedingly handy and useful tool for housekeepers, bar-keepers, dispensers of soda-water, and others using ice.

What I claim is—

The combination ice tool or implement described, consisting of the hatchet F, pick D, shovel $b\ d$, and cutter $c$, and a handle, A, all substantially as and for the purpose specified.

JOHN CRAWFORD.

Witnesses:
 RICHD. GERNER,
 F. BARRITT.